(12) United States Patent
Smith et al.

(10) Patent No.: US 7,020,770 B2
(45) Date of Patent: Mar. 28, 2006

(54) METHOD AND APPARATUS FOR CONFIGURATION OF RAID CONTROLLERS

(75) Inventors: Gerald Edward Smith, Suwanee, GA (US); Paresh Chatterjee, Fremont, CA (US); Basavaraj Gurupadappa Hallyal, Fremont, CA (US)

(73) Assignee: LSI Logic Corporation, Milpitas, CA (US)

( * ) Notice: Subject to any disclaimer, the term of this patent is extended or adjusted under 35 U.S.C. 154(b) by 576 days.

(21) Appl. No.: 10/194,348

(22) Filed: Jul. 12, 2002

(65) Prior Publication Data

US 2004/0010680 A1   Jan. 15, 2004

(51) Int. Cl.
*G06F 13/36* (2006.01)

(52) U.S. Cl. .......................................... 713/1
(58) Field of Classification Search ............... 713/1; 718/105; 712/225
See application file for complete search history.

(56) References Cited

U.S. PATENT DOCUMENTS

| | | | | |
|---|---|---|---|---|
| 5,355,508 A | * | 10/1994 | Kan ............................ | 712/20 |
| 5,517,669 A | * | 5/1996 | Ohkura et al. ............... | 709/226 |
| 5,729,705 A | * | 3/1998 | Weber ......................... | 710/315 |
| 6,108,684 A | * | 8/2000 | DeKoning et al. .......... | 718/105 |
| 6,205,445 B1 | * | 3/2001 | Tokuyama ................... | 707/10 |
| 6,442,650 B1 | * | 8/2002 | Bachmat et al. ............ | 711/114 |
| 6,529,505 B1 | * | 3/2003 | Davis et al. ................. | 370/389 |
| 6,578,128 B1 | * | 6/2003 | Arsenault et al. ........... | 711/202 |
| 2001/0049774 A1 | * | 12/2001 | Otterness et al. ........... | 711/148 |
| 2002/0184481 A1 | * | 12/2002 | Bish et al. ................... | 713/1 |

* cited by examiner

*Primary Examiner*—John R. Cottingham
(74) *Attorney, Agent, or Firm*—Yee & Associates, P.C.

(57) ABSTRACT

A method, apparatus, and computer instructions for configuring a set of controllers. The configuration of multiple controllers may be achieved through a combination of a host application and a controller application. A host application and a controller application are employed to configure the set of controllers in which the host application is employed to relay commands from the controller application to other controllers as well as provide other functions, such as, for example, a user interface to receive input for configuring the controllers. A request is sent from the controller application executing on a selected controller within the set of controllers to the host application executing in host memory. The request is for an execution of a command in at least one of the set of controllers in response to a requirement to configure the set of controllers. Execution of the command in one or more controllers in the set of controllers is initiated by the host application in response to receiving the request from the controller application.

26 Claims, 7 Drawing Sheets

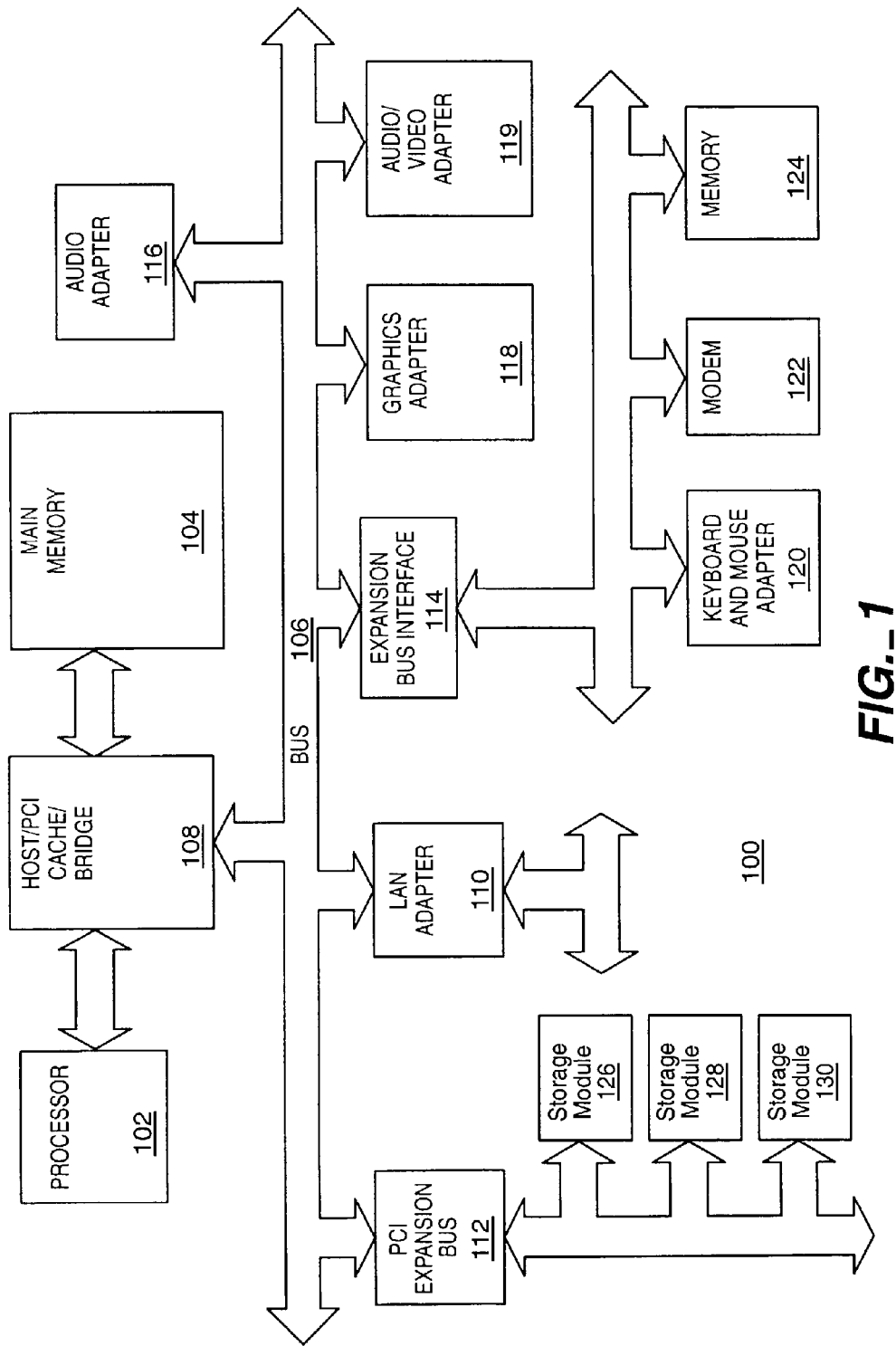
FIG._1

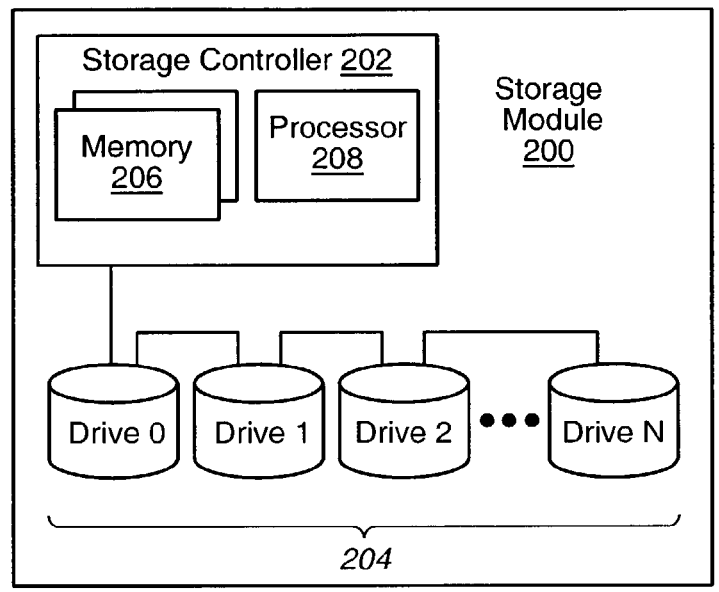
FIG._2
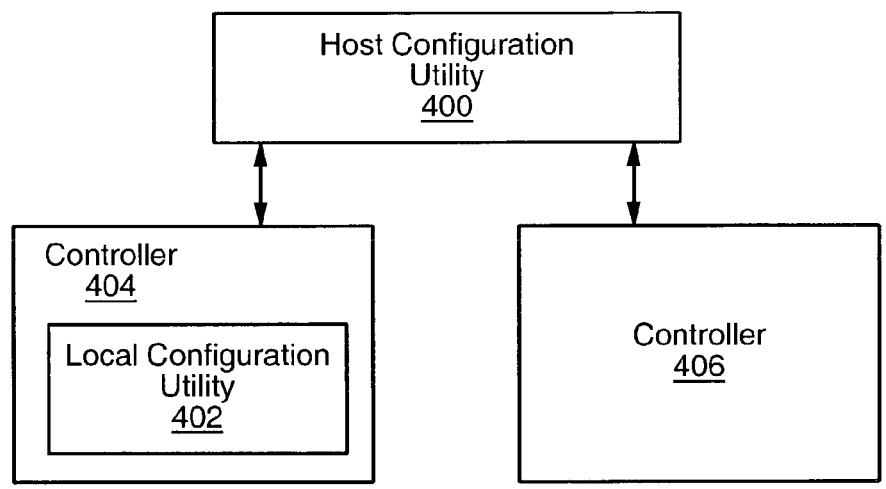
FIG._4

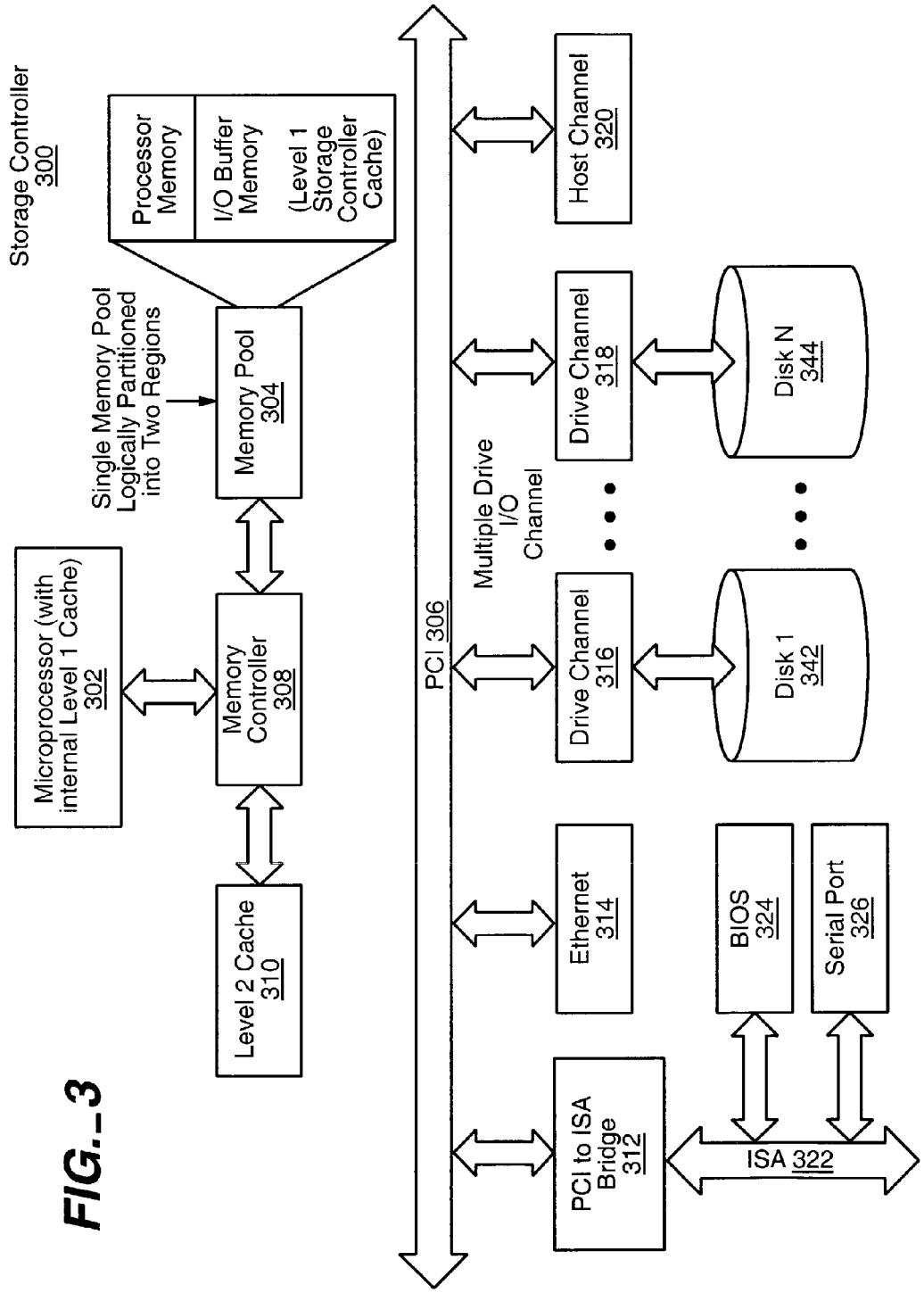
FIG._3

```
/*
 * CTRLMAPP.H - Header file defining the interface between FW and the HOST application
 */ ifndef INCLUDE_CTRLMAPP
define INCLUDE_CTRLMAPP

/*
 * define host-app CtrlM typedefs
 */
typedef uint16 t_screenBuffer[25] [80];           /* screen buffer */            500

/*
 * define CtrlM command opcodes
 */
#define MISC_OPCODE              0xA4   /* CtrlM uses the MISC opcode */
#define CTRLM_CMD                0x36
#define CTRLM_OP_INIT            0      /* initialize CtrlM */
#define CTRLM_OP_EXEC            1      /* run CtrlM */
#define CTRLM_OP_GET_SCREEN      2      /* get the current screen */
#define CTRLM_OP_GET_VERSION     3      /* return version string for FW-resident CtrlM
*/

/*
 * define application-supplied structure containing list of adapters
 * to be supported.
 */
#define CTRLM_ADAPTER_NAME_LENGTH    48
typedef struct _CTRLM_ADAPTER_INFO {
     uint8       bus;
     uint8       device;
     uint8       function;
     uint8       reserved1;
     uint16      vendorId;
     uint16      deviceId;              /* device /vendor IDs for this adapter */
     uint16      subVendorId;
     uint16      subDeviceId;
     uint32      reserved2;
     char        name [CTRLM_ADAPTER_NAME_LENGTH]; /* description for this adpater */
} t_CTRLM_ADAPTER_INFO;

#define CTRLM_MAX_ADAPTERS              12
typedef struct _CTRLM_ALL_ADAPTER_INFO {
     uint32      count;                 /* number of adapters found */
     t_CTRLM_ADAPTER_INFO    info [CTRLM_MAX_ADAPTERS];
} t_CTRLM_ADAPTER_INFO;                                                          502

/*
 * define CtrlM states
 */
typedef enum _CTRLM_STATE {             /* current Ctrl-M state */
     CTRLM_INACTIVE                = 0,
     CTRLM_IDLE                    = 1,
     CTRLM_RUNNING                 = 2,
     CTRLM_EXECUTING_CMD           = 3,
     CTRLM_WAITING_FOR_KB_INPUT    = 4,
     CTRLM_FLUSHING_SCREEN         = 5,
} t_CTRLM_STATE;
```

FIG._5A

```
/*
 * define the union/structure used to proivide infromation to the host application
 * from the CtrlM resident in FW
 */
typedef struct _CTRLM_STATE_INFO
      uint32    state;                    /* current state (type t_CTRLM_STATE) */
      /*
       * the following union defines the data returned by CtrlM (for the host app to act on)
       * based on the current state.
       */
      union
            /*
             * CTRLM_EXECUTING_CMD - Host needs to issue this command
             */
            struct _CTRLM_STATE_INFO_EXEC_CMD {                                      ┌─506
                  uint8    mailbox[14];    /* mailbox command to be issued by host application */
                  uint8    adapterNumber;  /* adapter number to which this command will be sent */
                  uint8    pad;            /* reserved for future use */          508 ─┘
                  uint8    data[32768];    /* data area used by command
                                              (manage by FW - host app should not touch) */
            } execCmd;
                                                                                   └─510
            /*
             * CTRLM_FLUSHING_SCREEN - host needs to update screen data
             */
            t_screenBuffer  screenData;   /* current screen data - host should update real video */

/*
             * CTRLM_WAITING_FOR_KB_INPUT - host should get keyboard input
             */
            struct _CTRLM_STATE_INFO_KBINPUT
                  uint8    row;           /* desired cursor row position for input
                                             (0-based, FF=no cursor) */
                  uint8    column;        /* desired cursor row position for input (0-based) */
                  int16    timeout;       /* input timeout in seconds (-1=no timeout) */
            } kbInput;

/*
             * CTRLM_INACTIVE - CtrlM has exited
             */
            int32 exitCode;
      } data;
} t_CTRLM_STATE_INFO;

#endif /* INCLUDE_CTRLM */
```

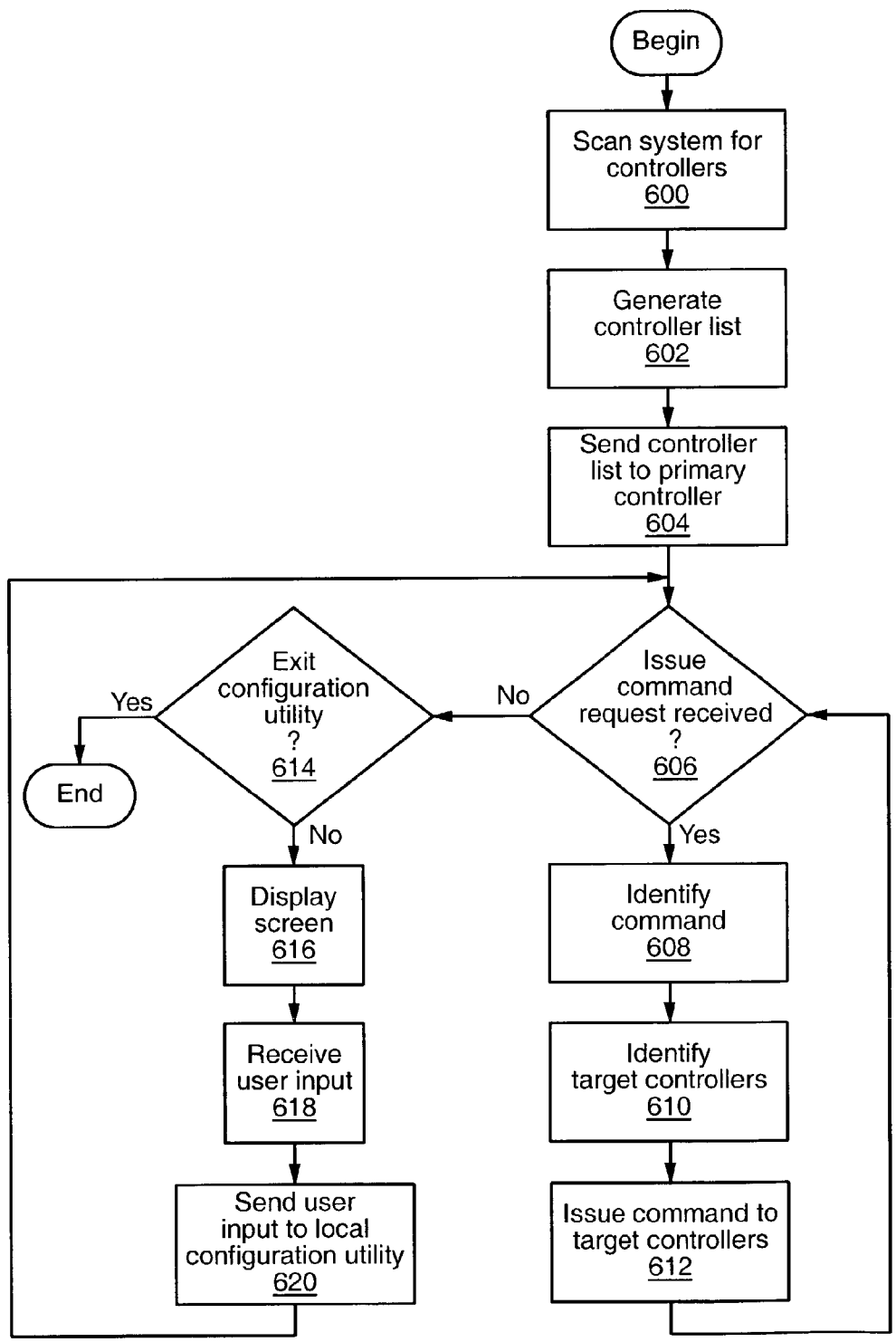
FIG._6

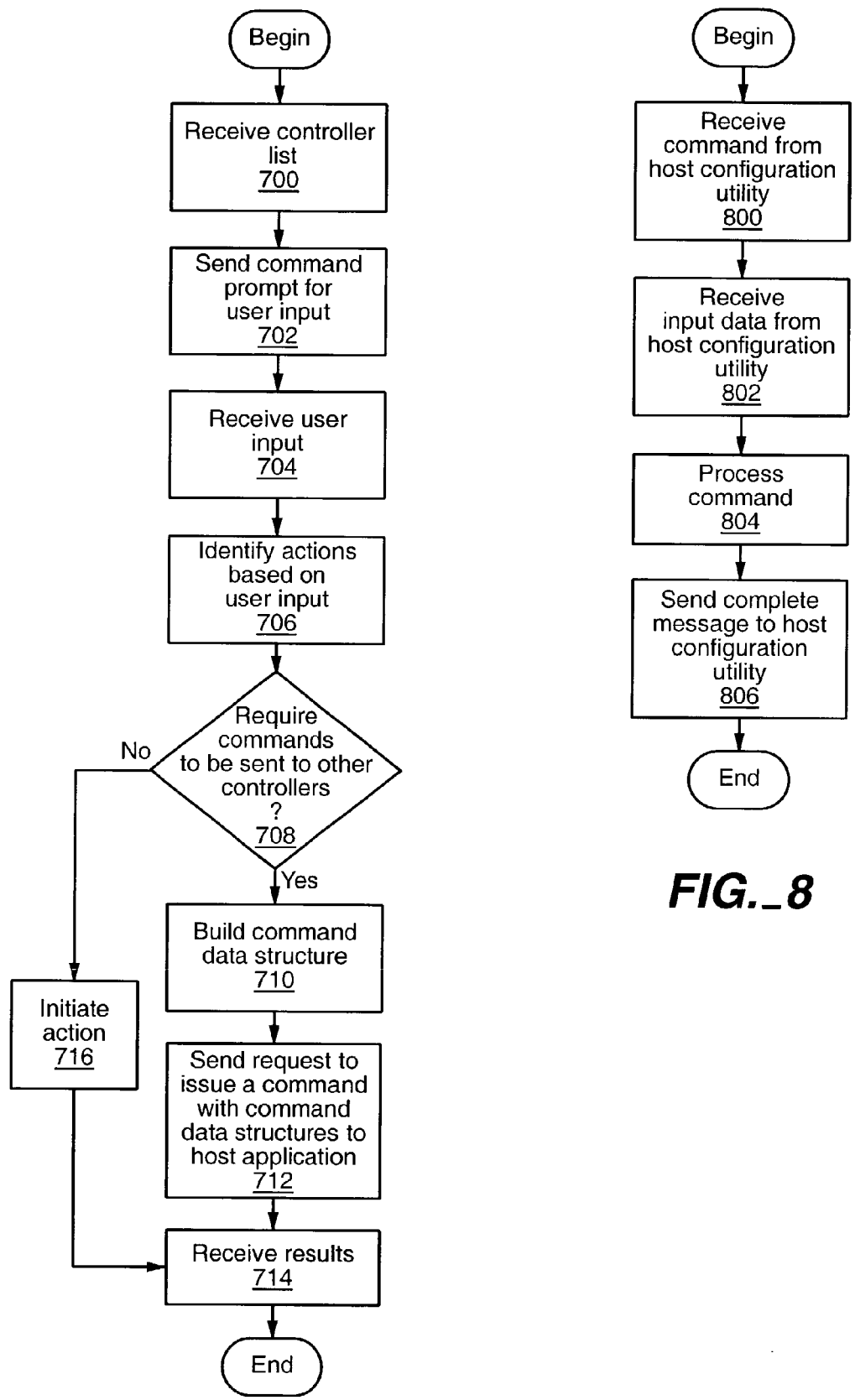

METHOD AND APPARATUS FOR CONFIGURATION OF RAID CONTROLLERS

BACKGROUND OF THE INVENTION

1. Technical Field

The present invention is directed generally toward a method and apparatus for configuring devices in a data processing system. Still more particularly, the present invention relates to a method and apparatus for configuring multiple controllers in a data processing system.

2. Description of the Related Art

A redundant array of independent disks (RAID) is a disk subsystem that is used to increase performance and/or provide fault tolerance. RAID includes a set of two or more ordinary hard disks and a specialized disk controller that contains the RAID functionality. Developed initially for servers and stand-alone disk storage systems, RAID is increasingly popular in desktop PCs primarily for fault tolerance. RAID can also be implemented via software only, but with less performance, especially when rebuilding data after a failure.

RAID improves performance by disk striping, which interleaves bytes or groups of bytes across multiple drives. This disk striping allows for the reading and writing of more than one disk simultaneously. Fault tolerance in these types of systems is achieved by mirroring or parity. With mirroring, a one hundred percent duplication of the data occurs on two drives. This configuration is referred to as RAID 1. In RAID 3 and 5, parity is used to calculate the data in two drives and store the results on a third drive. Specifically, a bit from drive 1 is XOR'd with a bit from drive 2, and the result bit is stored on drive 3. With this type of configuration, a failed drive can be hot swapped with a new one, and the RAID controller automatically rebuilds the lost data from the failed drive.

RAID systems come in all sizes from desktop units to floor-standing models. Any desktop PC can be turned into a RAID system by adding a RAID controller board and the appropriate number of IDE or SCSI disks. Stand-alone units may also include large amounts of cache as well as redundant power supplies. RAID controllers require special configuration programs, which are used to create and manage RAID volumes and controller features. As new features are added, the complexity of these programs increase. In some cases, host memory requirements may exceed available memory for these configuration programs using host memory. These configuration utilities are typically used during the booting of a data processing system. During this boot phase, many systems have only a limited amount of memory for use. For example, many systems may have 256 megabytes of memory available during the booting of a system, but only 192 kilobytes to about 256 kilobytes are actually usable while the system is booting without causing a system crash. By exceeding the available memory, the configuration utility may crash the data processing system. One solution is to move configuration functions from the host side into the firmware of the RAID controller. One problem with this type of solution is that the firmware configuration utility typically can only control the controller on which the utility runs. This limitation becomes a problem when multiple controllers are present in a data processing system because configuring multiple controllers is impossible from only a single controller.

Therefore, it would be advantageous to have an improved method, apparatus, and computer instructions for managing configuration of multiple controllers.

SUMMARY OF THE INVENTION

The present invention provides a method, apparatus, and computer instructions for configuring a set of controllers. The configuration of multiple controllers may be achieved through a combination of a host application and a controller application. A host application and a controller application are employed to configure the set of controllers in which the host application is employed to relay commands from the controller application to other controllers as well as provide other functions, such as, for example, a user interface to receive input for configuring the controllers. A request is sent from the controller application executing on a selected controller within the set of controllers to the host application executing in host memory. The request is for an execution of a command in at least one of the set of controllers in response to a requirement to configure the set of controllers. Execution of the command in one or more controllers in the set of controllers is initiated by the host application in response to receiving the request from the controller application.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 is a block diagram of a data processing system is shown in which the present invention may be implemented;

FIG. 2 is an example of a typical storage controller system, which may be configured, in accordance with a preferred embodiment of the present invention;

FIG. 3 is a diagram illustrating components in a controller in accordance with a preferred embodiment of the present invention;

FIG. 4 is a diagram illustrating components used to configure multiple controllers in accordance with a preferred embodiment of the present invention;

FIGS. 5A and 5B are diagrams illustrating data structures used to communicate information and commands between a local configuration utility and a host configuration utility in accordance with a preferred embodiment of the present invention;

FIG. 6 is a flowchart of a process used for configuring multiple controllers in accordance with a preferred embodiment of the present invention;

FIG. 7 is a flowchart of a process used for configuring multiple controllers in accordance with a preferred embodiment of the present invention; and FIG. 8 is a flowchart of a process used for processing a configuration command received from another controller in accordance with a preferred embodiment of the present invention.

DETAILED DESCRIPTION

With reference now to the figures and in particular with reference to FIG. 1, a block diagram of a data processing system is shown in which the present invention may be implemented. Data processing system 100 is an example of a computer in which code or instructions implementing the processes of the present invention may be located. Data processing system 100 employs a peripheral component interconnect (PCI) local bus architecture. Although the depicted example employs a PCI bus, other bus architectures such as Accelerated Graphics Port (AGP) and Industry Standard Architecture (ISA) may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, PCI expansion bus 112, and expansion bus interface 114 are connected to PCI local bus 106 by direct component connection. In contrast, audio adapter 116, graphics adapter 118, and audio/video adapter 119 are connected to PCI local bus 106 by add-in boards inserted into expansion slots. Expansion bus interface 114 provides a connection for a keyboard and mouse adapter 120, modem 122, and additional memory 124. PCI expansion bus 112 provides a connection for storage modules 126, 128, and 130. These storage modules may take various forms and handle different types of media, such as hard disks, tape, or optical disks. In these examples, storage modules 126, 128, and 130, are RAID storage modules configured as a RAID system using a RAID 5 configuration. Data is striped across three or more drives for performance, and parity bits are used for fault tolerance. The parity bits from two drives are stored on a third drive. The mechanism of the present invention allows for configuration of controllers within storage modules 126, 128, and 130, through a combination of a configuration utility, which has a host portion and a controller portion.

An operating system runs on processor 102 and is used to coordinate and provide control of various components within data processing system 100. The operating system may be a commercially available operating system such as Windows XP, which is available from Microsoft Corporation. Instructions for the operating system and applications or programs are located on storage devices, such as storage module 126, and may be loaded into main memory 104 for execution by processor 102.

Those of ordinary skill in the art will appreciate that the hardware in FIG. 1 may vary depending on the implementation. Other internal hardware or peripheral devices, such as flash read-only memory (ROM), equivalent nonvolatile memory, or optical disk drives and the like, may be used in addition to or in place of the hardware depicted in FIG. 1. Also, the processes of the present invention may be applied to a multiprocessor data processing system.

For example, data processing system 100 may be a stand-alone system configured to be bootable without relying on some type of network communication interface, whether or not data processing system 100 comprises some type of network communication interface.

The depicted example in FIG. 1 and above-described examples are not meant to imply architectural limitations. For example, data processing system 100 also may be a notebook computer or server computer. The processes of the present invention are performed by processor 102 using computer implemented instructions, which may be located in a memory such as, for example, main memory 104, memory 124, or in one or more storage modules 126–130.

Turning next to FIG. 2, an example of a typical storage controller system, which may be configured, is depicted in accordance with a preferred embodiment of the present invention. Storage module 200 is a more detailed example of a storage system, such as storage module 126, storage module 128, or storage module 130, in FIG. 1. An input/output (I/O) host, such as an application executed by a host processor, such as processor 102 in FIG. 1, sends read and write data access requests to storage module 200. The storage module includes storage controller 202 and disk drives 204. Storage controller 202 performs read and write operations to satisfy the data access requests of the I/O host.

Storage controller 202 includes memory 206 and processor 208. This memory may store various instructions for execution by processor 208, as well as serve as a storage controller level 1 cache. Data blocks that are read from disk drives 0–N may be stored in memory 206 so that frequently accessed data may be read from the faster memory device rather than the slower disk drives. Furthermore, memory 206 may also serve as intermediate storage for data blocks that are written to the disk drives. Subsequent reads of these data blocks may be found in the cache, thus reducing access time. Further, memory 206 serves as the location for a configuration utility used to configure storage controller 202 as well as other controllers connected to a data processing system, such as data processing system 100 in FIG. 1.

In these examples, disk drives 204 are configured in a RAID 5 configuration. More particularly, redundant array of independent disks (RAID) systems, may stripe data blocks and store each stripe on a different physical disk drive. For example, in the storage controller system shown in FIG. 2, a data block written to storage module 200 may be striped into N+1 stripes, each stripe being stored on a respective one of drives 0–N 204. With the greater number of reads and writes to physical drives in RAID systems, the importance of I/O cache is increased.

Turning next to FIG. 3, a diagram illustrating components in a controller is depicted in accordance with a preferred embodiment of the present invention. Storage controller 300 is a more detailed example of storage controller 202 in FIG. 2. As illustrated, storage controller 300 employs a peripheral component interconnect (PCI) local bus architecture. Although the depicted example employs a PCI bus, other bus architectures such as Industry Standard Architecture (ISA) may be used. Microprocessor 302, with internal level 1 cache, and memory pool 304 are connected to PCI local bus 306 through memory controller 308. Microprocessor level 2 cache 310 is also connected to memory controller 308. PCI to ISA bridge 312 also may include an integrated memory controller and cache memory for microprocessor 302.

In the depicted example, ethernet adapter 314, PCI to ISA bridge 312, drive channel adapters 316–318, and host channel adapter 320 are connected to PCI local bus 306 by direct component connection. PCI to ISA bridge 312 provides a connection through ISA bus 322 for basic input output system (BIOS) 324 and serial port 326.

Microprocessor 302 is used to coordinate and provide control of various components within storage controller 300 in FIG. 3. Instructions for the storage controller may be located on storage devices, such as BIOS 324, and may be loaded into memory pool 304 for execution by microprocessor 302. Instructions within BIOS 324 may include configuration controller functions for execution within storage controller 300 as well as instructions for execution on the host side, such as main memory 104 in data processing system 100 in FIG. 1. BIOS 324 as well as other programs may be stored on a nonvolatile memory, such as a flash memory or a read-only memory.

Memory pool 304 is a single memory pool that is logically partitioned into two regions. A first region serves as processor memory. This portion of memory is used by microprocessor 302, for example, as "scratch pad" memory to perform the operations of the storage controller. The second region of memory pool 304 serves as an I/O buffer memory or level 1 storage controller cache.

Drive channel adapters 316–318 provide drive channels for storage devices, such as hard disk drives. A storage controller may have, for example, four drive channels. Each drive channel may support multiple drives per channel. The number of drives is limited by I/O hardware and communication protocol. Performance and reliability of hard disks 342–344 may also be improved by using RAID storage configurations. For example, data may be striped (RAID 0) across disks 1–N. As another example, data stored on one disk, such as disk 342, may be mirrored (RAID 1) on another disk, such as disk 344. A combination of RAID 0 and RAID 1, referred to as RAID 1,0 or RAID 10, can also be used to stripe and mirror cache data stored on disks 1–N. Further, one disk may be used to store parity data (RAID 3) for the other disks. Still further, cache data and parity data may be striped across three or more drives for performance and fault tolerance (RAID 5). Other RAID techniques may also be used to manage the second level cache volume stored on disks 342 and 344.

With reference now to FIG. 4, a diagram illustrating components used to configure multiple controllers is depicted in accordance with a preferred embodiment of the present invention. In this example, host configuration utility 400 and local configuration utility 402 form a mechanism that is used to configure multiple controllers. Host configuration utility 400 is located in host memory, such as main memory 104 in FIG. 1, while local configuration utility 402 is located in the firmware of controller 404, such as BIOS 324 in FIG. 3.

The mechanism of the present invention moves many functions to local configuration utility 402 while leaving those functions essential for configuring multiple utilities in host configuration utility 400. Host configuration utility 400 issues commands to other RAID controllers other than the one on which local configuration utility 402 is executing. Depending on the particular implementation, the primary controller, controller 404, will actually send the commands to host configuration utility 400 for execution. In this case, local configuration utility 402 is running on controller 404. Host configuration utility 400 will issue any necessary commands to controller 406 while controller 404 will perform configuration functions locally. The limitations of configuring other controllers, such as controller 406, from a local configuration utility, such as local configuration utility 402, is overcome by using host configuration utility 400 to issue configuration commands to other controllers. Host configuration utility 400 is employed to control the keyboard and screen while local configuration utility 402 informs host configuration utility 400 of the host screen output and when user input is required. Local configuration utility 402 is provided the ability to access other controllers, such as controller 406, by informing host configuration utility 400 of the need and supplying the desired command to be issued. In turn, host configuration utility 400 issues the command to the desired controller. When the command is complete, the results are returned to controller 404.

When a data processing system is initialized, controller 404 and controller 406 initialize along with instructions on the host side needed to bring the data processing system to a running state. As part of this initialization, the configuration utility is run. Execution of the configuration utility is typically determined through a user request. An appropriate configuration program, such as host configuration utility 400, is loaded into host memory and execution begins. This utility may be obtained from a controller, such as controller 404. Specifically, instructions for the host portion of the configuration utility, host configuration utility 400, may be stored within controller 404. Host configuration utility 400 scans the data processing system for all controllers with which host configuration utility 400 can communicate. In these examples, local configuration utility 402 is the primary configuration utility for the controllers within the data processing system. When the list of the available controllers is complete, host configuration utility 400 passes the list of controllers along with a command, requesting the firmware-resident configuration program be initialized, to controller 404.

When controller 404 receives a command from host configuration utility to initialize a configuration program, local configuration utility 402 is initialized. Part of the initialization process includes initializing memory and registers for running local configuration utility 402 as well as saving a copy of the controller list generated by host configuration utility 400. After initialization, local configuration utility 402 begins execution. As part of the initialization, local configuration utility 402 will send a request to host configuration utility 400 to present a display screen to prompt the user to enter desired configuration actions. All the information needed for the display is sent to host configuration utility 400 by local configuration utility 402 in these examples. Upon receiving this data, the appropriate display is presented by host configuration utility 400. User input is received by host configuration utility 400 and sent back to local configuration utility 402.

Upon receiving the user input, local configuration utility 402 processes this input to determine what action or actions should be taken. In this example, the action requires a command to be sent to controller 406. In these examples, local configuration utility 402 causes creation of a data structure, containing the command to be executed along with any data required for the command. For example, the data may include an identification of the controller or controllers that are to receive the command. This identification information is identified from the list of controllers generated by host configuration utility 400 during initialization of the data processing system. The command and the data structure are built in host memory by local configuration utility 402. A request is then sent to host configuration utility 400 for processing. Upon receiving the request to execute a command, host configuration utility 400 uses the data structure to identify the command as well as the controller that is to receive the command. The command is then issued to the controller, controller 406 in these examples.

Upon receiving the command from host configuration utility 400, controller 406 will retrieve any data needed to execute the command from the data structure created by local configuration utility 402. Any outgoing or resulting data, generated during execution of the command, is written back into the data structure. A command complete message is sent to host configuration utility 400 by controller 406. This message is used to indicate that the command has been completed. The results are then sent back to local configuration utility 402 by host configuration utility 400. At that point, local configuration utility 402 will retrieve the results of a command from the data structure in the host memory and execution of the command completes with control being returned for further user input.

Turning next to FIGS. 5A and 5B, diagrams illustrating data structures used to communicate information and commands between a local configuration utility and a host configuration utility are depicted in accordance with a preferred embodiment of the present invention. Section 500 illustrates information that is placed in the header file of a data structure to define the interface between the host configuration utility and the local configuration utility. This header is present in all of the data structures. Specifically, the header information in section 500 is used both by the host configuration utility and the local configuration utility for defining the data structures used to pass data between these applications.

Section 502 illustrates an example data structure for passing a list of adapters identified by the host configuration utility to the local configuration utility. Section 504 is an example of a portion of a data structure used to issue a command to a controller. Line 506, in section 504, is the location of the command that is to be issued. The information in this line is filled in by the local configuration utility. Line 508, in section 504, identifies one or more controllers that are to receive the command. Line 510 is an area in which data, used in executing the command, is located. Results from execution of the command by a controller may be written into the data area for line 510.

Turning now to FIG. 6, a flowchart of a process used for configuring multiple controllers is depicted in accordance with a preferred embodiment of the present invention. The process illustrated in FIG. 6 may be implemented in a host side application, such as host configuration utility 400, in FIG. 4.

The process begins by scanning a system for controllers (step 600). A controller list is generated (step 602). The list of controllers may be stored in a data structure containing a section, such as section 502, in FIG. 5A. The controller list is sent to the primary controller (step 604). The primary controller in these examples is controller 404 in FIG. 4. Next, a determination is made as to whether an issue command request has been received (step 606). If an issue command request has been received, a command is identified (step 608), and target controllers are identified (step 610). The command is issued to the target controllers (step 612) with the process returning to step 606 as described above. The command and identification of target controllers to receive the command are identified in a data structure created in host memory by a local configuration utility. This data structure may include a section, such as section 504, in FIG. 5B.

With reference again to step 606, if an issue command request has not been received, a determination is made as to whether the request is to exit the configuration utility (step 614). If the request is to exit the configuration utility, the process terminates. Otherwise, the request is assumed to be one to display a screen to the user. In response to this type of request, a display screen is presented for receiving user input (step 616). Thereafter, user input is received (step 618), and the user input is sent to the local configuration utility (step 620) with the process then returning to step 606.

With reference now to FIG. 7, a flowchart of a process used for configuring multiple controllers is depicted in accordance with a preferred embodiment of the present invention. The process illustrated in FIG. 7 may be implemented in a local configuration utility, such as local configuration utility 402 in FIG. 4.

The process begins by receiving a controller list (step 700). A command prompt is sent for user input (step 702). The command prompt is sent to the host controller utility to display an interface to receive user input. In response, user input is received (step 704), and actions are identified based on the user input (step 706). Next, a determination is made as to whether the commands are required to be sent to other controllers (step 708). In some cases, the user input may result in a command that is executed only locally. If commands are required to be sent to other controllers, a command data structure is built (step 710). The command data structure includes a section, such as section 504 in FIG. 5B. A request to issue a command with command data structures is sent to the host application (step 712). The results are received (step 714) and the process terminates thereafter.

Returning again to step 708, if the commands are not required to be sent to other controllers, action is initiated (step 716) and the process proceeds to step 714 as described above.

With reference now to FIG. 8, a flowchart of a process used for processing a configuration command received from another controller is depicted in accordance with a preferred embodiment of the present invention. The process illustrated in FIG. 8 may be implemented in a controller, such as controller 406 in FIG. 4.

The process begins by receiving a command from a host configuration utility (step 800). Input data is received from the host configuration utility (step 802). In these examples, the command and data used in executing the command are received in a data structure containing a section, such as section 504 in FIG. 5B. The command is processed (step 804). Some example configuration commands are Read Current Configuration, Write New Configuration, Delete a RAID Volume, and Search for Physical Disks. After the command has been processed, a complete message is sent to the host configuration utility to indicate that the command has been processed (step 806) and the process terminates thereafter.

Thus, the present invention provides an improved method, apparatus, and computer instructions for configuring multiple controllers through a single controller. In these examples, a primary controller is present in which the configuration utility runs. A portion of the configuration utility is executed on the host side in host memory to allow for commands to be sent to other controllers. In this manner, many of the features and functions for configuring controllers may be located and run in the controller, while only those necessary to relay commands, results, and obtain user input are located in a host portion of the host configuration utility. By minimizing the functions on the host side, the amount of host memory needed to configure controllers is reduced. Consequently, with the reduced size of the host portion of the application, problems associated with using too much host memory are minimized, resulting in reduced crashes of a data processing system.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The illustrated examples are directed towards RAID controllers. The mechanism of the present invention may be applied to other controller systems other than those for RAID storage systems. For example, the mechanism of the present invention may be applied to configuring multiple controllers for a tape drive or video display system. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for configuring a set of controllers, the method comprising:
    responsive to a requirement to configure the set of controllers, sending a request from a controller application executing on a selected controller within the set of controllers to a host application executing in host memory, wherein the request is for an execution of a command in at least one of the set of controllers; and
    responsive to receiving the request at the host application, initiating execution of the command in the at least one of the set of controllers.

2. The method of claim 1 further comprising:
    receiving a result from each of the set of controllers executing the command to form a set of results; and
    sending the set of results to the controller application.

3. The method of claim 1, wherein the set of controllers is a set of redundant array of independent disk controllers.

4. The method of claim 1, wherein computer instructions for the controller application are stored within firmware in the selected controller.

5. The method of claim 4, wherein computer instructions for the host application are stored within the firmware in the selected controller.

6. The method of claim 4, wherein the firmware is an erasable programmable read only memory in the selected controller.

7. The method of claim 1, wherein computer instructions for the host application are stored within firmware in the selected controller.

8. The method of claim 2, wherein the results are sent in a data structure.

9. The method of claim 1, wherein the requirement is obtained through a user input received through the host application.

10. The method of claim 1, wherein the request includes an identification of the at least one of the set of controllers.

11. The method of claim 1, wherein the selected controller sends the command to the host application.

12. The method of claim 1, wherein the controller application sends the command to the host application.

13. A data processing system for configuring a set of controllers, the data processing system comprising:
    a bus system;
    a communications unit connected to the bus system;
    a memory connected to the bus system, wherein the memory includes a set of instructions; and
    a processing unit connected to the bus system, wherein the processing unit executes the set of instructions to send a request from a controller application executing on a selected controller within the set of controllers to a host application executing in host memory in which the request is for an execution of a command in at least one of the set of controllers in response to a requirement to configure the set of controllers; and initiate execution of the command in the at least one of the set of controllers in response to receiving the request at the host application.

14. A data processing system for configuring a set of controllers, the data processing system comprising:
    sending means, responsive to a requirement to configure the set of controllers, for sending a request from a controller application executing on a selected controller within the set of controllers to a host application executing in host memory, wherein the request is for an execution of a command in at least one of the set of controllers; and
    initiating means, responsive to receiving the request at the host application, for initiating execution of the command in the at least one of the set of controllers.

15. The data processing system of claim 14, wherein the sending means is a first sending means and further comprising:
    receiving means for receiving a result from each of the set of controllers executing the command to form a set of results; and
    second sending means for sending the set of results to the controller application.

16. The data processing system of claim 14, wherein the set of controllers is a set of redundant array of independent disk controllers.

17. The data processing system of claim 14, wherein computer instructions for the controller application are stored within firmware in the selected controller.

18. The data processing system of claim 17, wherein computer instructions for the host application are stored within the firmware in the selected controller.

19. The data processing system of claim 17, wherein the firmware is an erasable programmable read only memory in the selected controller.

20. The data processing system of claim 14, wherein computer instructions for the host application are stored within firmware in the selected controller.

21. The data processing system of claim 15, wherein the results are sent in a data structure.

22. The data processing system of claim 14, wherein the requirement is obtained through a user input received through the host application.

23. The data processing system of claim 14, wherein the request includes art identification of the at least one of the set of controllers.

24. The data processing system of claim 14, wherein the selected controller sends the command to the host application.

25. The data processing system of claim 14, wherein the controller application sends the command to the host application.

26. A computer program product in a computer readable medium for configuring a set of controllers, the computer program product comprising:
    first instructions, responsive to a requirement to configure the set of controllers, for sending a request from a controller application executing on a selected controller within the set of controllers to a host application executing in host memory, wherein the request is for an execution of a command in at least one of the set of controllers; and
    second instructions, responsive to receiving the request at the host application, for initiating execution of the command in the at least one of the set of controllers.

* * * * *